US011286890B2

(12) United States Patent
Miura

(10) Patent No.: US 11,286,890 B2
(45) Date of Patent: Mar. 29, 2022

(54) VALVE MEMBER AND EVAPORATIVE FUEL PROCESSING SYSTEM

(71) Applicant: HAMANAKODENSO CO., LTD., Kosai (JP)

(72) Inventor: Yuichiro Miura, Kariya (JP)

(73) Assignee: HAMANAKODENSO CO., LTD., Kosai (JP)

( * ) Notice: Subject to any disclaimer, the term of this patent is extended or adjusted under 35 U.S.C. 154(b) by 220 days.

(21) Appl. No.: 16/666,826

(22) Filed: Oct. 29, 2019

(65) Prior Publication Data

US 2020/0141363 A1 May 7, 2020

(30) Foreign Application Priority Data

Nov. 1, 2018 (JP) ............................ JP2018-206580

(51) Int. Cl.
*F02M 25/08* (2006.01)
*F16K 1/46* (2006.01)

(52) U.S. Cl.
CPC .... *F02M 25/0854* (2013.01); *F02M 25/0836* (2013.01); *F16K 1/46* (2013.01)

(58) Field of Classification Search
CPC ....... F02M 25/0854; F02M 2025/0845; F02M 25/08; F02M 25/0836; F16K 1/46
See application file for complete search history.

(56) References Cited

U.S. PATENT DOCUMENTS 4,572,396 A * 2/1986 Kasugai ............. B60K 15/0406 220/203.25
2015/0143996 A1 5/2015 Kimoto et al.
2017/0284321 A1* 10/2017 Kimoto .............. F02M 25/0836

FOREIGN PATENT DOCUMENTS

JP 57-102765 2/1955
JP 62-137474 6/1987
JP 9-292038 11/1997
JP 2015-83859 4/2015

* cited by examiner

*Primary Examiner* — Jacob M Amick
(74) *Attorney, Agent, or Firm* — Nixon & Vanderhye P.C.

(57) ABSTRACT

A bottom wall portion of a valve member has an annular convex portion projecting from a bottom surface toward a valve seat. A rubber seal member has a flat plate portion in contact with the bottom wall portion, and an annular lip portion formed to project toward the valve seat at a position corresponding to the convex portion in the flat plate portion so as to abut on the valve seat at the time of valve closing. A projecting tip of the lip portion forms an arc-shaped part in the axial cross section of the valve member. A projecting tip of the convex portion forms an arc-shaped part having a curvature radius larger than a curvature radius of the arc-shaped part of the lip portion in the axial cross section of the valve member.

9 Claims, 8 Drawing Sheets

1 24 14 36 39 34 30 35 25 31 22 33 32 21 23 F 40 Ⅲ 41 28 50 52 27 26

VALVE MEMBER AND EVAPORATIVE FUEL PROCESSING SYSTEM

CROSS REFERENCE TO RELATED APPLICATION

The present application is based on Japanese Patent Application No. 2018-206580 filed on Nov. 1, 2018, disclosure of which are incorporated herein by reference.

TECHNICAL FIELD

The present disclosure relates to a valve member and an evaporative fuel processing system.

BACKGROUND

An evaporative fuel processing system recovers evaporative fuel of a fuel tank and supplies it to an intake system of an internal combustion engine.

SUMMARY

The valve member is movable in a moving direction which is a direction toward or away from the valve seat in a flow control valve and is driven to shut off or pass the flow of fluid. The valve member has a rubber seal member integrally formed on a bottom wall portion.

The bottom wall portion has an annular convex portion projecting from the bottom surface to the valve seat side. The rubber seal member has a flat plate portion in contact with the bottom wall portion, and an annular lip portion formed to project toward the valve seat at a position corresponding to the convex portion in the flat plate portion so as to abut on the valve seat at the time of valve closing. A projecting tip of the lip portion forms an arc-shaped part in the axial cross section of the valve member. A projecting tip of the convex portion is an arc-shaped part having a curvature radius larger than that of the lip portion, or a flat part perpendicular to the moving direction.

DETAILED DESCRIPTION

Hereinafter, a plurality of embodiments will be described with reference to the drawings.

First Embodiment

[Configuration]

Figure 1:
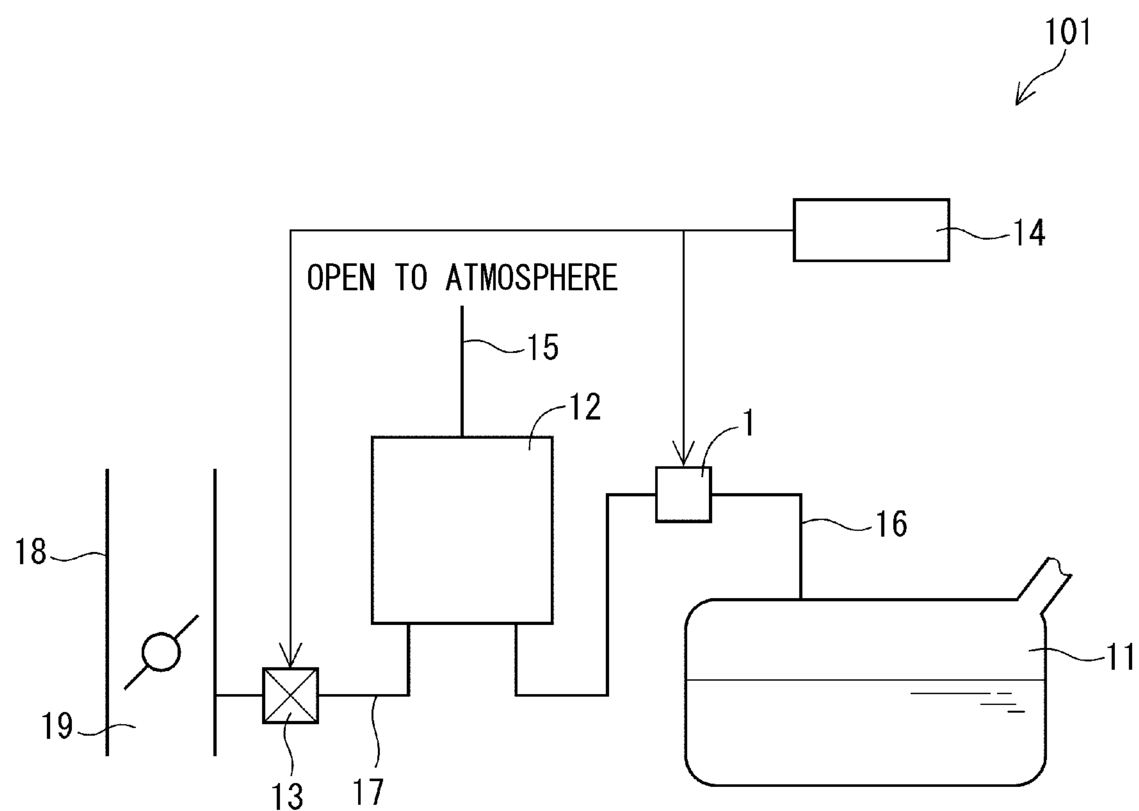
FIG. 1 is a schematic view showing a configuration of an evaporative fuel processing system.
Figure 2:
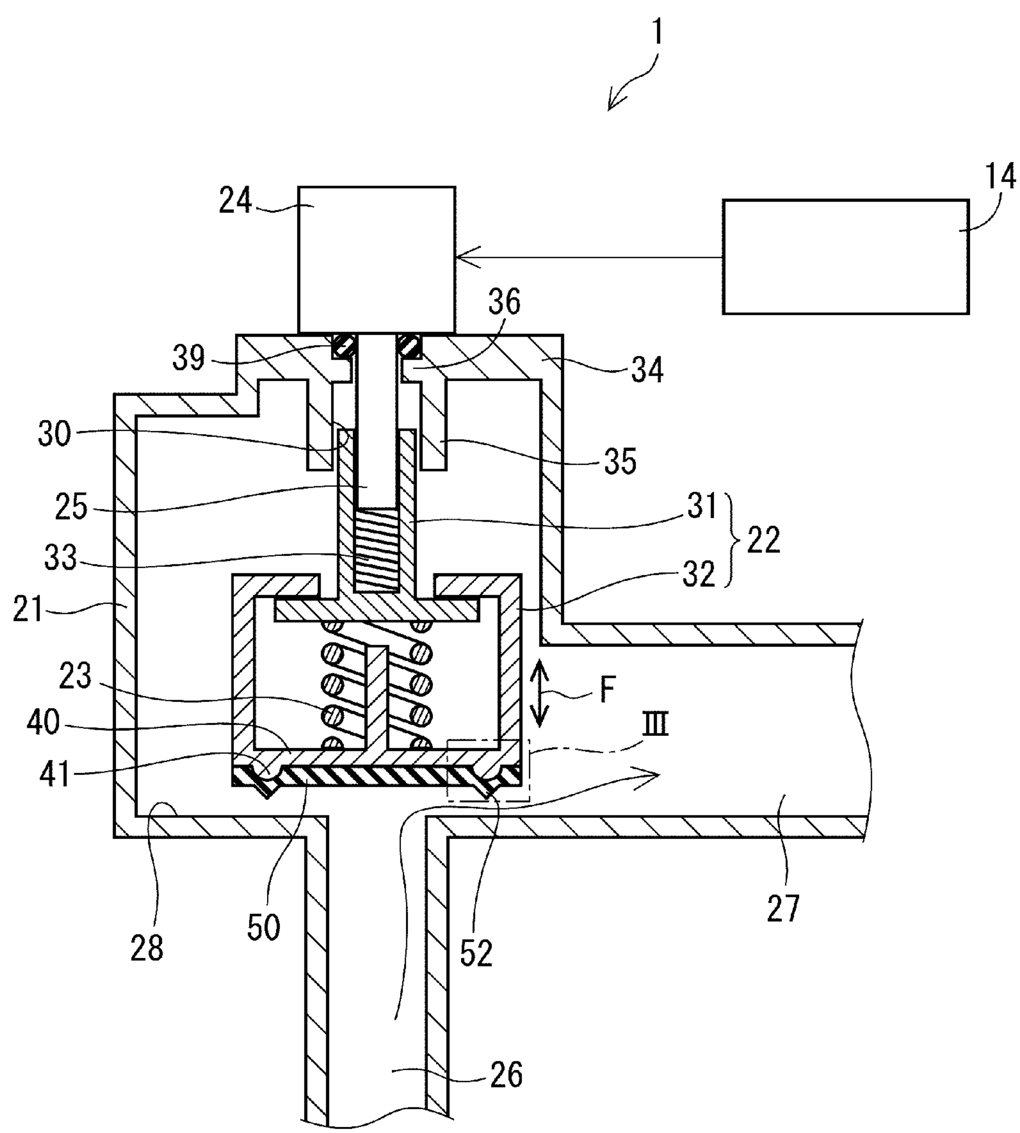
FIG. 2 is a cross-sectional view schematically showing a flow control valve according to a first embodiment.

The configuration of the first embodiment will be described with reference to FIGS. 1 to 3. As shown in FIG. 1, an evaporative fuel processing system 101 includes a flow control valve 1, a fuel tank 11, a canister 12, a purge valve 13, an ECU (Electronic Control Unit) 14 and the like.

The fuel tank 11 is mounted on a vehicle and stores the fuel supplied to an internal combustion engine 18. The canister 12 has an adsorbent (not shown) that recovers the evaporative fuel generated in the fuel tank 11. The canister 12 performs a purge process. In the purge process, the air taken in through the atmosphere passage 15 is sent to an intake passage 19 of the internal combustion engine 18 through a purge passage 17 together with the evaporative fuel adsorbed to the adsorbent of the canister 12 through the vapor passage 16. The vapor passage 16 is a passage connecting the fuel tank 11 and the canister 12, and the flow control valve 1 is provided to the vapor passage 16. In addition, the purge valve 13 is provided to the purge passage 17. The amount of evaporative fuel purged from the canister 12 to the intake passage 19 is adjusted in accordance with the opening degree of the purge valve 13.

Here, for example, while the vehicle is parked, since the flow control valve 1 is maintained in the closed state, the evaporative fuel of the fuel tank 11 does not flow into the canister 12. Further, for example, the flow control valve 1 is maintained in the open state until the tank cap is opened and the fuel supply to the fuel tank 11 is started and the fuel supply is completed. Therefore, at the time of refueling, the evaporative fuel in the fuel tank 11 is adsorbed by the adsorbent in the canister 12 through the vapor passage 16. Thus, the flow control valve 1 controls whether the fuel tank 11 and the canister 12 communicate with each other. The ECU 14 is electrically connected to the flow control valve 1 and the purge valve 13 and controls the opening/closing operation of each of the valves 1 and 13.

Next, the configuration of the flow control valve 1 will be described with reference to FIG. 2. A curve with the arrow in FIG. 2 shows an example of a moving path of the evaporative fuel. In addition, FIG. 2 is a cross-sectional view, and the lines visible behind the cut surface are omitted. In FIG. 2, symbol F indicates the "moving direction" in which the valve member 22 described later moves to the open state or to the closed state. The flow control valve 1 includes a housing 21, a valve member 22, a spring 23, a motor 24, a motor shaft 25, and the like. The housing 21 has a substantially cylindrical shape, and has a flow path through which the evaporative fuel flows from the fuel tank side flow passage 26 to the canister side flow passage 27. In the housing 21, a plane extending in the direction orthogonal to the moving direction of the valve member 22 from an edge of a port of the fuel tank side flow passage 26 is referred to as a valve seat 28.

The valve member 22 shuts off the fuel tank side flow passage 26 and the canister side flow passage 27 so that the evaporative fuel does not pass to the canister side flow passage 27, or communicates the fuel tank side flow passage 26 and the canister side flow passage 27 so that the evaporative fuel passes to the canister side flow passage 27.

The valve member 22 has a bottomed small diameter cylindrical member 31 and a bottomed large diameter cylindrical member 32. The central axes of the small diameter cylindrical member 31 and the large diameter cylindrical member 32 coincide with each other. The small diameter cylindrical member 31 is located on the motor side with respect to the large diameter cylindrical member 32 and is integrally provided. A spring 23 is provided between the bottom of the small diameter cylindrical member 31 and the bottom of the large diameter cylindrical member 32. FIG. 2 shows an open state in which the valve member 22 is most separated from the valve seat 28.

A threaded groove 33 is formed on the inner periphery of the small diameter cylindrical member 31. A motor shaft 25 is inserted in the small diameter cylindrical member 31, and a threaded portion formed on an outer periphery of the motor shaft 25 and a threaded groove 33 of the small diameter cylindrical member 31 are coupled with each other.

A cylindrical convex portion 35 is formed on the bottom wall portion 34 of the housing 21 so as to protrude to the inside of the housing 21. The convex portion 35 forms the insertion hole 30 of the motor shaft 25 and prevents the valve member 22 from rotating. A part of the small diameter cylindrical member 31 is inserted from the valve member 22 side of the rotation preventing convex portion 35. A predetermined gap is formed between the inner peripheral surface of the rotation preventing convex portion 35 and the outer peripheral surface of the small diameter cylindrical member 31. A motor shaft 25 is inserted from the motor side of the rotation preventing convex portion 35. That is, the motor shaft 25 is provided to penetrate the housing 21. The motor shaft 25 couples the motor 24 and the valve member 22 so that the rotational force of the motor 24 can be transmitted to the valve member 22.

The motor 24 is provided outside the housing 21 in contact with the bottom wall portion 34 of the housing 21. The motor drive causes the motor shaft 25 to rotate in a specific direction so that the valve member 22 moves in the closing direction approaching the valve seat 28 or in the opening direction separating from the valve seat 28. By the reciprocating movement of the valve member 22 as described above, a rubber seal member 50 described later of the valve member 22 abuts on or separates from the valve seat 28.

In the rotation preventing convex portion 35, a seal member receiving portion 36 having an annular shape is formed so as to protrude in a radially inward direction. A rubber O-ring 39 is provided between the motor 24 and the seal member receiving portion 36, and seals a penetrating portion of the motor shaft 25 so that the evaporative fuel does not leak from the housing 21.

Next, the configuration around the bottom wall portion of the valve member 22 will be described with reference to FIG. 3. FIG. 3 is an enlarged view of the bottom wall portion of the valve member 22 corresponding to an area surrounded by a two-dot chain line in FIG. 2.

Figure 3:
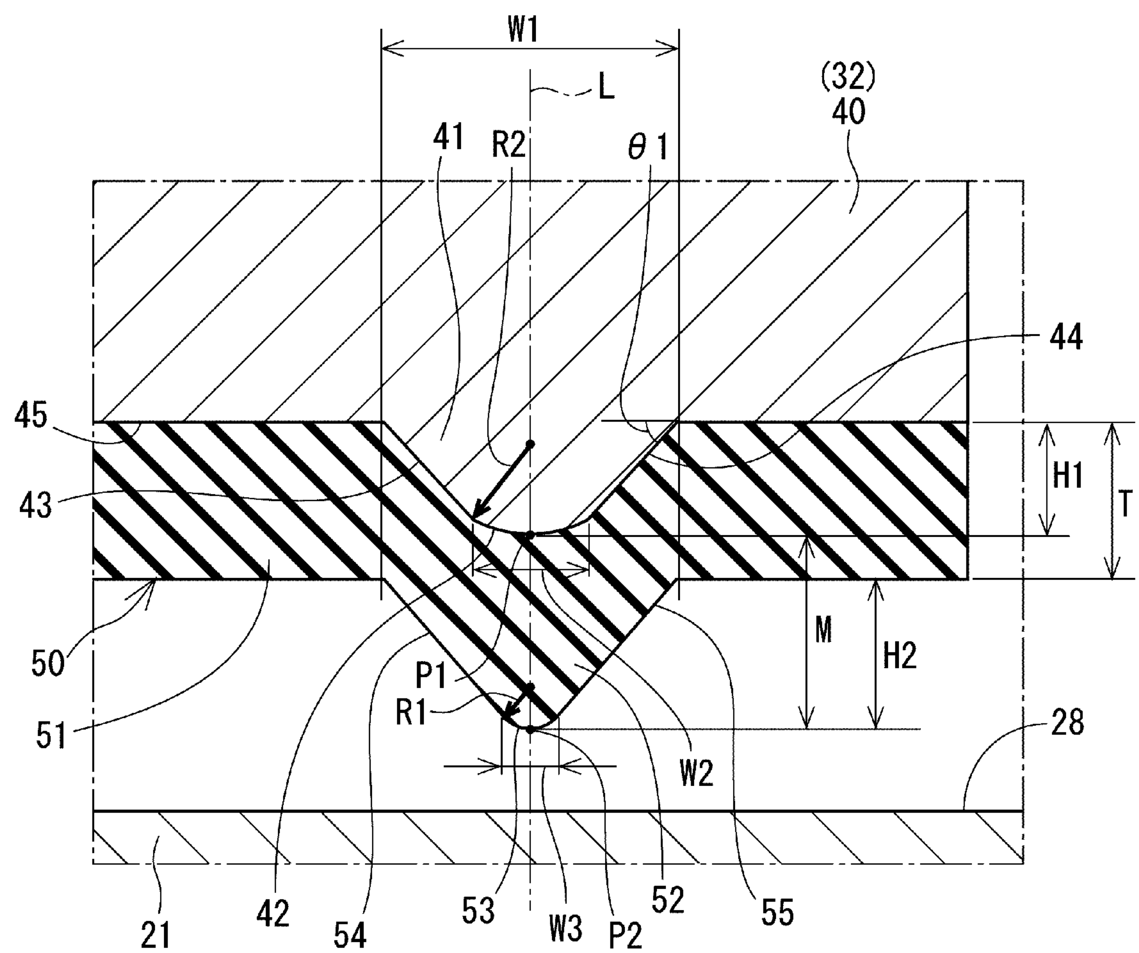
FIG. 3 is an enlarged cross-sectional view showing the vicinity of a bottom wall portion of the valve member according to the first embodiment.

As shown in FIG. 3, the large diameter cylindrical member 32 has a bottom wall portion 40 and a rubber seal member 50. The main body of the large diameter cylindrical member 32 including the bottom wall portion 40 is made of, for example, metal, resin, or the like. The bottom wall portion 40 has an annular convex portion 41 projecting toward the valve seat 28 side. The convex portion 41 has an arc-shaped part 42, an inner inclined part 43, and an outer inclined part 44. According to a cross section in a plane parallel to the moving direction and including a central axis of the valve member 22 (hereinafter simply referred to as "moving direction cross section"), the arc-shaped part 42 is formed at the projecting tip of the convex portion 41 including the vertex P1, and has an arc shape with a curvature radius R2.

The inner inclined part 43 is continuously formed on the radially inner side of the arc-shaped part 42. The outer inclined part 44 is continuously formed on the radially outer side of the arc-shaped part 42. Each of the inclined parts 43, 44 has a flat surface. The angle between the inner inclined part 43 and a bottom surface 45 and the angle between the outer inclined part 44 and the bottom surface 45 are the same. When the angle between the inclined parts 43 and 44 and the bottom surface 45 is expressed as "inclination angle θ1", the inclination angle θ1 is approximately 30 degrees to 60 degrees. When viewed in the moving direction cross section, the convex portion 41 is parallel to the moving direction and symmetrical with respect to a straight line L passing the vertex P1. In the present embodiment, a radial width of the arc-shaped part 42 is approximately twice a radial width of the inner inclined part 43 and the outer inclined part 44.

The rubber seal member 50 is welded integrally with the bottom wall portion 40. The rubber seal member 50 has a flat plate portion 51 having a circular shape in a cross-section and an annular lip portion 52. The lip portion 52 is formed to project toward the valve seat 28 from a position near the outer periphery of the flat plate portion 51, and abuts on the valve seat 28 to seal the flow passage when the valve is closed. The lip portion 52 is formed at a position corresponding to the convex portion 41 of the bottom wall portion 40 in the moving direction. The radial width W1 of the convex portion 41 and the lip portion 52 is substantially the same.

The lip portion 52 has a substantially triangular shape when viewed in the moving direction cross section, and includes an arc-shaped part 53, an inner inclined part 54, and an outer inclined part 55. The arc-shaped part 53 has an arc shape with a curvature radius R1 when viewed in the moving direction cross section, and is formed at the projecting tip of the lip portion 52 including the vertex P2. The inner inclined part 54 is continuously formed on the radially inner side of the arc-shaped part 53. The outer inclined part 55 is continuously formed on the radially outer side of the arc-shaped part 53. When viewed in the moving direction cross section, the lip portion 52 is parallel to the moving direction and symmetrical with respect to a straight line L passing the vertex P2. The vertex P2 of the lip portion 52 and the vertex P1 of the convex portion 41 are both on the straight line L.

The curvature radius R2 of the arc-shaped part 42 of the convex portion 41 is larger than the curvature radius R1 of the arc-shaped part 53 of the lip portion 52. That is, with respect to the projecting tip of the lip portion 52, the projecting tip of the convex portion 41 has a gentler sharpening. The projection height H1 of the convex portion 41 is smaller than the thickness T of the flat plate portion 51 of the rubber seal member 50, and the convex portion 41 is within the thickness T of the flat plate portion 51. The radial width W2 of the arc-shaped part 42 of the convex portion 41 is larger than the radial width W3 of the arc-shaped part 53 of the lip portion 52. The projection height H2 of the lip portion 52 is larger than the projection height H1 of the convex portion 41.

(Effects)

When the valve member 22 moves toward the valve seat 28 during valve closing, the lip portion 52 of the rubber seal member 50 abuts on the valve seat 28. When the valve member 22 further moves toward the valve seat 28, the rubber seal member 50 located between the arc-shaped part 53 of the lip portion 52 and the arc-shaped part 42 of the convex portion 41 is crushed so as to seal the flow passage. In the first embodiment, the curvature radius R2 of the arc-shaped part 42 of the convex portion 41 is larger than the curvature radius R1 of the arc-shaped part 53 of the lip portion 52. Therefore, the internal stress generated between the bottom wall portion 40 and the rubber seal member 50 can be reduced at the time of valve closing, and the convex portion 41 can be prevented from breaking through the lip portion 52 to be damaged, and the durability of the rubber seal member 50 can be improved.

For example, in the case where the projecting tip of the lip portion 52 is sharpened to a smaller size in order to improve the sealing performance, that is, where the curvature radius of the arc-shaped part 53 of the lip portion 52 is reduced, if the curvature radius of the convex portion 41 in the bottom wall portion 40 is small, the stress inside the valve becomes high, and there is a possibility that the convex portion 41 pierces the lip portion 52 and is broken. In the first embodiment, such a problem can be solved.

Furthermore, in the first embodiment, the convex portion 41 is accommodated in the thickness of the flat plate portion 51 so that the projection height H1 of the convex portion 41 does not exceed the thickness T of the flat plate portion 51 of the rubber seal member 50. Furthermore, the projection height H2 of the lip portion 52 is larger than the projection height H1 of the convex portion 41. Therefore, a large crushing margin M, which is the distance between the vertex P1 of the convex portion 41 and the vertex P2 of the lip portion 52, can be secured. Further, when the lip portion 52 is crushed, it is easy to expand in the radial direction, so that the seal margin can be increased, and the seal performance can be improved. That is, in the valve member 22 of the flow control valve 1 of the first embodiment, the sealing performance and the durability can be improved.

Second Embodiment

Next, the valve member of the second embodiment will be described with reference to FIG. 4. In the following embodiments, the components substantially the same as that of the first embodiment is given the same reference numeral as that of the first embodiment, and the description thereof will be omitted. In the second embodiment, the shape of the convex portion of the bottom wall portion is different from the valve member of the first embodiment.

Figure 4:
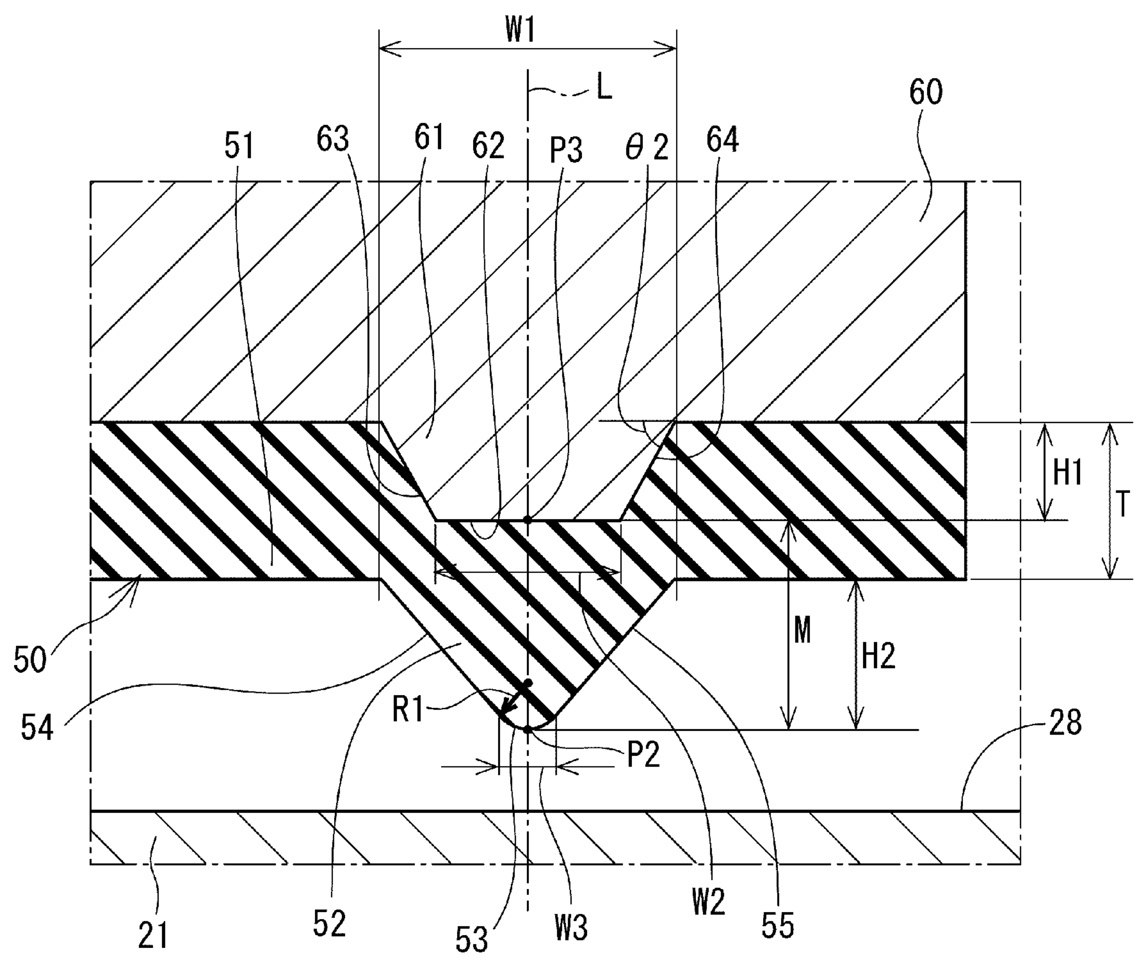
FIG. 4 is an enlarged cross-sectional view showing the vicinity of a bottom wall portion of the valve member according to a second embodiment.

As shown in FIG. 4, the annular convex portion 61 formed on the bottom wall portion 60 has a flat part 62, an inner inclined part 63 and an outer inclined part 64. That is, the projecting tip end of the convex portion 61 does not have an R shape as in the first embodiment, and forms a smooth flat surface. The flat part 62 is perpendicular to the moving direction of the valve member 22. In addition, the projection height H1 of the convex portion 61 is the same as that of the convex portion 41 in the first embodiment. The radial center P3 of the flat part 62 is the center of the projecting tip of the convex portion 61. The inclination angle 82 between each of the inclined parts 63 and 64 and the bottom surface is approximately 60 degrees. The convex portion 61 is parallel to the moving direction and has a symmetrical shape with respect to a line L which passes through the radial center P3 of the projecting tip of the convex portion 61, when viewed in the moving direction cross section.

According to the second embodiment, the projecting tip of the convex portion 61 in the bottom wall 60 is formed as the flat part 62, therefore the same effect as that of the first embodiment can be obtained.

Third Embodiment

Figure 5:
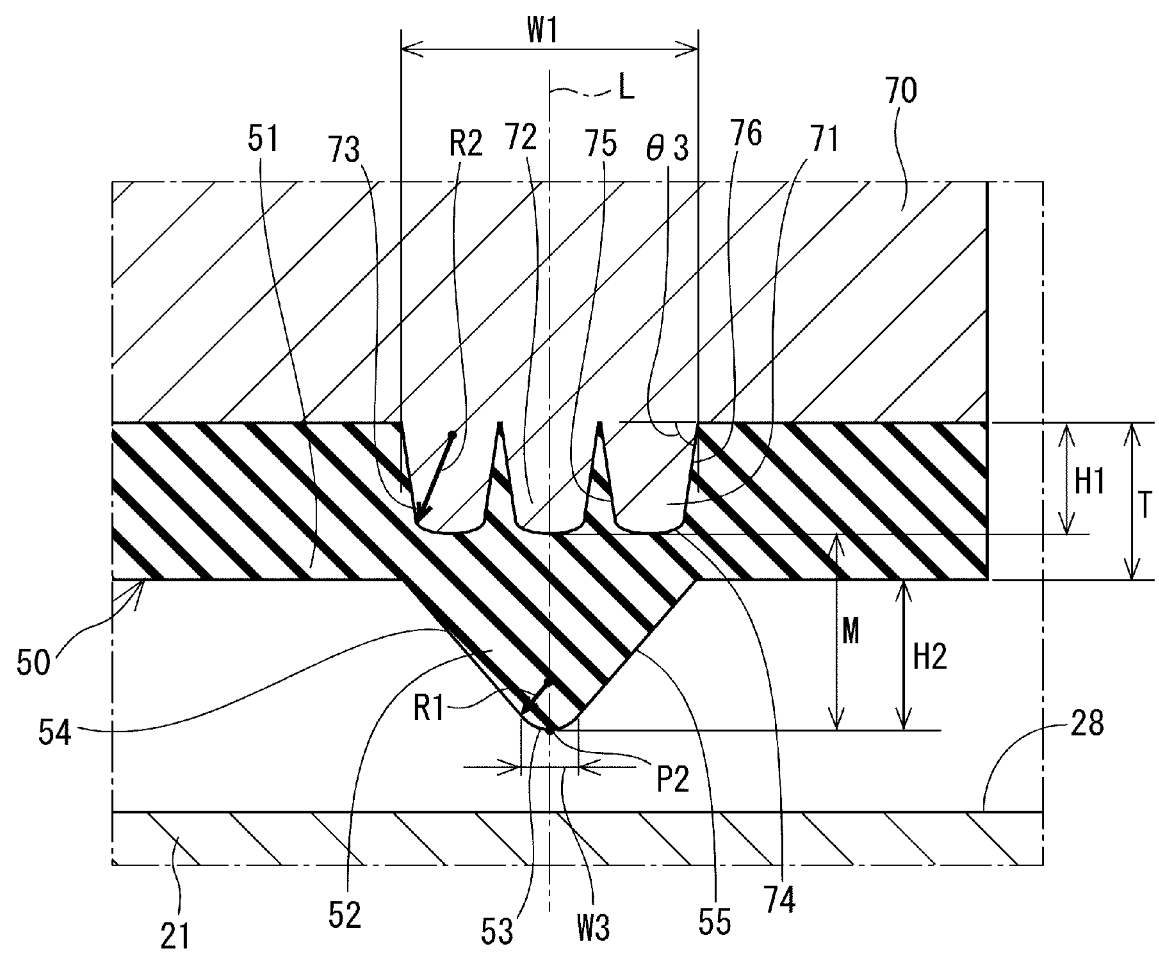
FIG. 5 is an enlarged cross-sectional view showing the vicinity of a bottom wall portion of the valve member according to a third embodiment.

Next, the valve member of the third embodiment will be described with reference to FIG. 5. In the third embodiment, the shape of the convex portion of the bottom wall portion is different from the valve member of the first embodiment. As shown in FIG. 5, on the bottom wall portion 70, a plurality of (three in the present embodiment) convex portions 71, 72, 73 having an annular shape are formed in order from the radially outer side.

The shape of each convex portion 71, 72, 73 is the same. The configuration of the convex portion 71 located on the outermost side (right side shown in FIG. 5) will be described as an example. The convex portion 71 has an arc-shaped part 74, an inner inclined part 75, and an outer inclined part 76. The inclination angle 83 between each of the inclined parts 75 and 76 and the bottom surface is approximately 80 degrees.

According to the third embodiment, the same effects as those of the first embodiment can be obtained. Further, by providing a plurality of the convex portions 71, 72, 73, the contact area with the rubber seal member 50 is increased, and the adhesive force and the adhesive force can be increased.

Fourth Embodiment

Figure 6:
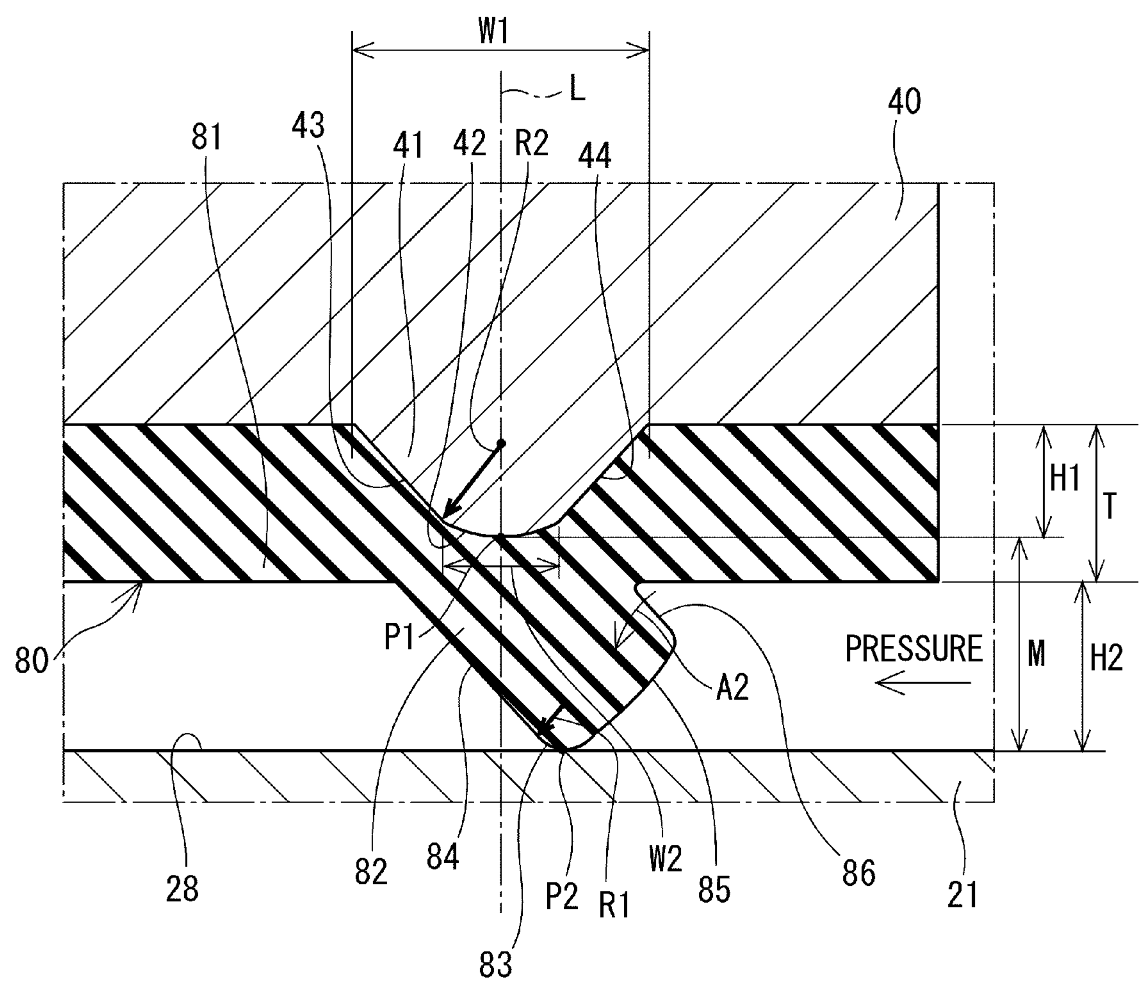
FIG. 6 is an enlarged cross-sectional view showing the vicinity of a bottom wall portion of the valve member according to a fourth embodiment.

Next, the valve member of the fourth embodiment will be described with reference to FIG. 6. In the fourth embodiment, the shape of the lip portion of the rubber seal member is different from that of the valve member in the first embodiment. As shown in FIG. 6, the lip portion 82 formed in the rubber seal member 80 of the fourth embodiment has an arc-shaped part 83, an inner inclined part 84, an outer inclined part 85, and a pressure receiving recess 86. The pressure receiving recess 86 is formed on the outer edge of the lip portion 82, and continuously with the outer inclined part 85.

FIG. 6 shows the valve closing state in which the lip portion 82 abuts on the valve seat 28. When the valve is closed, the pressure on the outside of the lip portion 82 is higher than the pressure on the inside, the pressure receiving recess 86 receives pressure in the direction shown by the arrow A2. The entire lip portion 82 bends in a direction in which the arc-shaped part 83 which is the projecting tip of the lip portion 82 is pressed against the valve seat.

As described above, according to the fourth embodiment, the same effect as that of the first embodiment can be obtained, and further, the sealing force by the lip portion 82 can be improved.

Fifth Embodiment

Figure 7:
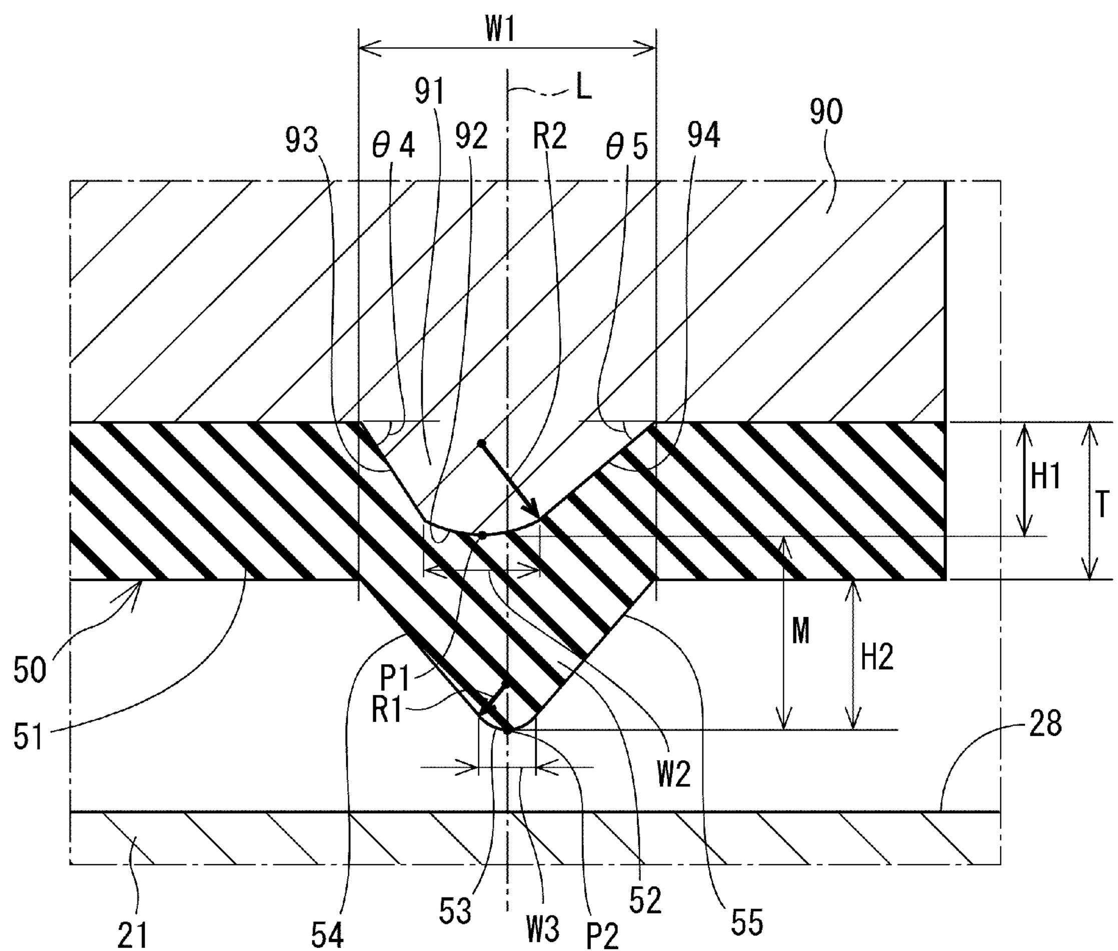
FIG. 7 is an enlarged cross-sectional view showing the vicinity of a bottom wall portion of the valve member according to a fifth embodiment.

Next, the valve member of the fifth embodiment will be described with reference to FIG. 7. In the fifth embodiment, the shape of the convex portion of the bottom wall portion is different from the valve member of the first embodiment. As shown in FIG. 7, the convex portion 91 of the fifth embodiment has an arc-shaped part 92, an inner inclined part 93, and an outer inclined part 94. The inclination angle 84 between the inner inclined part 93 and the bottom surface is larger than the inclination angle 85 between the outer inclined part 94 and the bottom surface. That is, in the fifth embodiment, the inclination angle 84 of the inner inclined part 93 and the inclination angle 85 of the outer inclined part 94 are different, and the shape of the convex portion 91 of the bottom wall portion 90 is asymmetrical in the moving direction cross section. The remaining structures are the same as in the first embodiment.

In the present embodiment, as in the second embodiment, the projecting tip of the convex portion 61 may be configured to be the flat part 62.

Other Embodiments

In each of the above embodiments, the convex portions 41, 61, 71, 72, 73, 91 and the lip portions 52, 82 may be slightly shifted in the moving direction, and the widths W1 of the convex portion and the lip portion may not be completely coincident with each other. If the convex portion and the lip portion have a positional relationship at least overlapping in the moving direction, it is interpreted that the convex portion and the lip portion are in a "corresponding position".

In each of the above embodiments, the projection height H1 of the convex portions 41, 61, 71, 72, 73, 91 is within the height of the flat part 51 of the rubber seal member 50, but the projection height H1 may exceed the thickness T of the flat plate portion 51.

In each of the above embodiments, each inclined portion is a flat surface, but may be a gentle curved surface. In addition, the inclination angle of each inclined portion can be appropriately changed.

Figure 8:
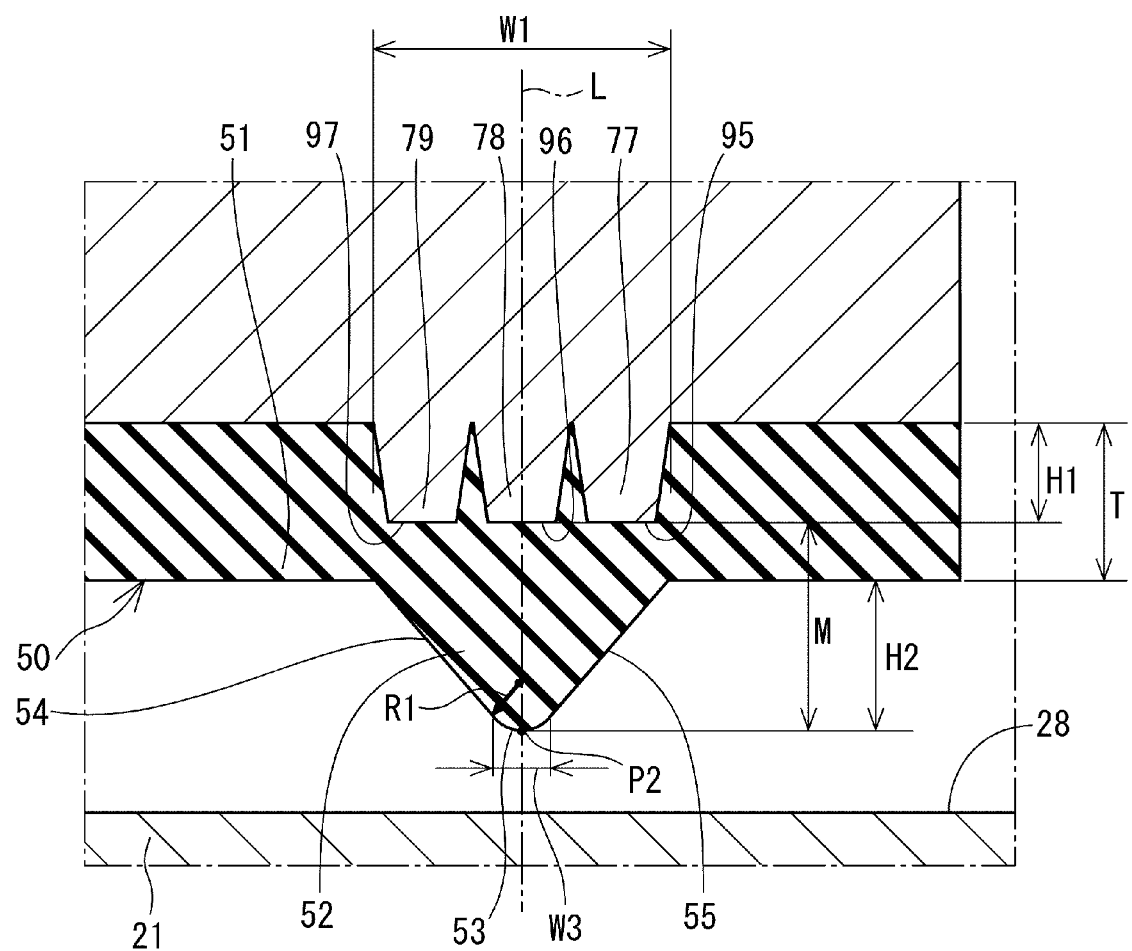
FIG. 8 is an enlarged cross-sectional view showing the vicinity of a bottom wall portion of the valve member according to another embodiment.

In the third embodiment, the projecting tips of the convex portions 71, 72, 73 form the arc-shaped part 74. However, as shown in FIG. 8, the projecting tips of the convex portions 77, 78, 79 are flat parts 95, 96, 97. When a plurality of convex portions are formed, the number is not limited to three, and may be two or four or more.

The valve member 22 according to each of the above embodiments includes the small diameter cylindrical member 31 and the large diameter cylindrical member 32. However, the valve member 22 is not limited to the configuration, and may be configured by one cylindrical member. Further, in the valve member 22, the shape in the cross section perpendicular to the axial direction may not be circular. For example, it may be a regular polygon having a central axis.

The valve member 22 of each of the above embodiments is applied to the flow control valve 1 provided in the vapor passage 16 connecting the canister 12 and the fuel tank 11 in the evaporative fuel processing system 101. However, the valve member 22 may be implemented as the flow control valve for another system, and the fluid flowing to the valve member is not limited to evaporative fuel.

The present disclosure is not limited to the embodiments described above, and various modifications are possible within the scope of the present disclosure without departing from the spirit of the invention.

For example, in the assumable flow control valve described in patent document (JP H9-292038A), a rubber valve seat is integrally formed on a seat attachment surface of a valve body. The rubber valve seat has a flat plate portion and an annular seat portion projecting from an outer peripheral part of the flat plate portion toward the valve seat. On the other hand, on a sheet attachment surface of the valve body, an annular convex portion having a shape substantially similar to the shape of the annular seat portion is formed. A projecting tip of the annular seat portion and the projecting tip of the annular convex portion both have an R shape (round shape).

However, in the flow control valve, if the radius of the annular seat portion on the rubber valve seat side is reduced to improve the sealing performance, and temporarily, the radius R of the annular convex portion on the sheet attachment surface side is also small, the internal stress of the valve is increased.

There has been a problem that the annular convex portion may break through the annular seat portion and be damaged during use.

The object of the present disclosure is to provide a valve member and an evaporative fuel processing system that are capable of improving the durability.

The valve member of the present disclosure is movable in a moving direction which is a direction toward or away from the valve seat (28) in a flow control valve (1) and is driven to shut off or pass the flow of fluid. The valve member is a bottomed valve member, and a rubber seal member (50, 80) is integrally formed on a bottom wall portion (40, 60, 70, 90).

The bottom wall portion has an annular convex portion (41, 61, 71, 72, 73, 91) projecting from the bottom surface (45) to the valve seat side. The rubber seal member has a flat plate portion (51, 81) in contact with the bottom wall portion, and an annular lip portion (52, 82) formed to project toward the valve seat at a position corresponding to the convex portion in the flat plate portion so as to abut on the valve seat at the time of valve closing. The projecting tip of the lip portion forms an arc-shaped part (53, 83) in the axial cross section of the valve member. The projecting tip of the convex portion is an arc-shaped part (42, 74, 92) having a curvature radius larger than that of the lip portion, or a flat part (62) perpendicular to the moving direction.

According to the present disclosure, the convex portion formed on the bottom wall portion corresponds in position to the lip portion formed on the rubber seal member, and the projecting tip of the convex portion forms an arc-shaped part having a curvature radius R2 larger than the curvature radius R1 of the arc-shaped part of the projecting tip of the lip portion, or a flat part perpendicular to the moving direction. That is, with respect to the projecting tip of the lip portion 52, the projecting tip of the convex portion 41 has a gentler sharpening.

Usually, the main body of the valve member including the bottom wall portion is made of resin or metal material and is harder than the rubber seal member. For this reason, when the internal stress generated between the bottom wall portion and the rubber seal member is large at the time of valve closing, there is a possibility that the convex portion may break through the lip portion. In the present disclosure, since the shape of the projecting tip of the convex portion corresponding to the position of the lip portion is formed in a loose R shape or a flat surface, the internal stress generated between the bottom wall portion and the rubber seal member can be reduced, it is possible to prevent the convex portion from breaking through the lip portion and to improve the durability.

The invention claimed is:

1. A valve member that is movable in a moving direction, which is a direction toward or away from a valve seat in a flow control valve, and that is driven to shut off or pass flow of fluid, comprising:

- a bottom wall portion having an annular convex portion that projects from a bottom surface to the valve seat side; and
- a rubber seal member integrally formed on the bottom wall portion, the rubber seal member having a flat plate portion in contact with the bottom surface, and an annular lip portion formed to project toward the valve seat at a position corresponding to the convex portion in the flat plate portion so as to abut on the valve seat at the time of valve closing, wherein a projecting tip of the lip portion forms an arc-shaped part in an axial cross section of the valve member, and a projecting tip of the convex portion is an arc-shaped part having a curvature radius larger than that of the arc-shaped part of the lip portion in the axial cross section of the valve member, or a flat part perpendicular to the moving direction.

2. The valve member according to claim 1, wherein the convex portion includes an inner inclined part continuous to the inner side of the projecting tip of the convex portion, and an outer inclined part continuous to the outer side of the projecting tip of the convex portion, and an angle formed between the inner inclined part and the bottom surface is equal to an angle formed between the outer inclined part and the bottom surface.

3. The valve member according to claim 1, wherein the projecting tip of the convex portion is formed at a projection height that fits within a thickness of the flat plate portion.

4. The valve member according to claim 1, wherein a plurality of the convex portions are formed.

5. The valve member according to claim 1, wherein the lip portion has a pressure receiving recess at an outer edge of the lip portion, and the pressure receiving recess is configured to receive pressure from the outside of the lip portion so that the projecting tip of the lip portion bends in the direction of pressing the valve seat during valve closing.

6. The valve member according to claim 1, wherein a radial width of the arc-shaped part of the convex portion is larger than the radial width of the arc-shaped part of the lip portion, and a projection height of the lip portion is larger than a projection height of the convex portion.

7. The valve member according to claim 2, wherein the angle is approximately 30 degrees to 60 degrees.

8. The valve member according to claim 2, wherein a vertex of the lip portion and a vertex of the convex portion are both on the straight line.

9. An evaporative fuel processing system, comprising:

a fuel tank;

a canister that adsorbs evaporative fuel generated in the fuel tank; and a flow control valve provided in a vapor passage connecting the fuel tank and the canister, the flow control valve having the valve member according to claim 1, and configured to shut off a fuel tank side flow passage and the canister side flow passage to prevent the evaporative fuel from passing the fuel tank side flow passage to the canister side flow passage, or communicate the fuel tank side flow passage with the canister side flow passage so as to pass the evaporative fuel through the fuel tank side flow passage and the canister side flow passage.

* * * * *